Patented June 28, 1949

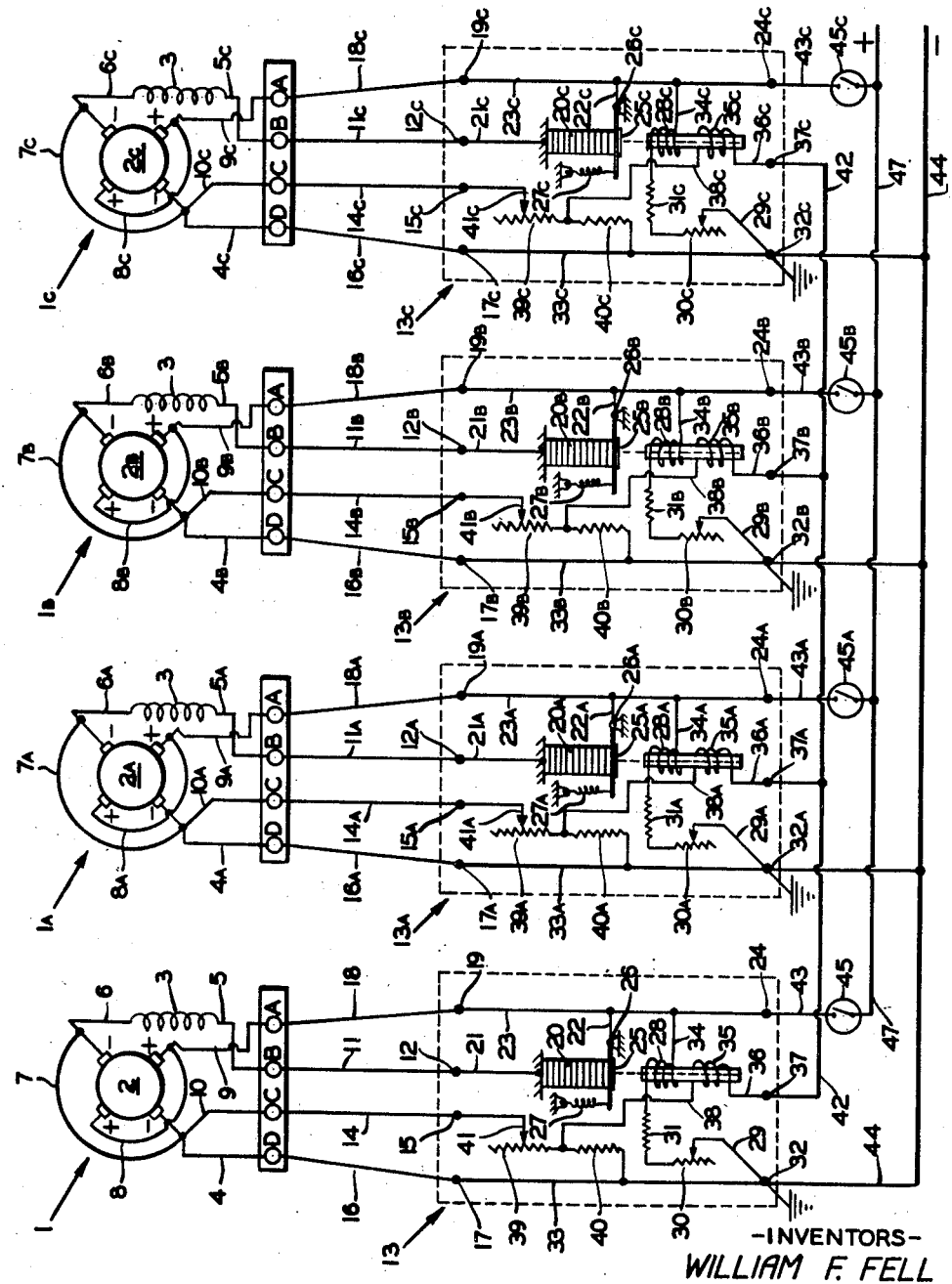

2,474,732

UNITED STATES PATENT OFFICE 2,474,732

AUTOMATIC CONTROL SYSTEM FOR DYNAMOELECTRIC MACHINES

William F. Fell and Evan S. Smith, Hasbrouck Heights, N. J., assignors to Bendix Aviation Corporation, Teterboro, N. J., a corporation of Delaware Original application August 10, 1943, Serial No. 498,122. Divided and this application February 19, 1946, Serial No. 648,782

2 Claims. (Cl. 171—119)

The present application is a division of co-pending application Serial No. 498,122, filed August 10, 1943, now abandoned, and relates to automatic control systems for dynamo electric machines and more particularly to the regulation of the current flow in the field of a dynamo electric machine or series of machines for purposes of regulating the voltage thereof and maintaining the load properly divided between the machines after they are connected in parallel.

An object of the invention is to provide an improved method of regulation of the voltage of a current generator.

Another object of the invention is to provide an improved regulating system involving a novel combination and inter-relationship of elements functioning as a unit to provide the desired regulation for a series of generators operating in parallel relationship to supply a common load.

Another object of the invention is to provide a novel system of control for a plurality of sources of current whereby the voltage of the sources of current may be maintained at a substantially constant value, including means for varying the voltage setting of the sources so as to effect a predetermined load division between the respective sources by balancing the setting of the respective sources.

Another object of the invention is to provide a novel arrangement for varying the datum or voltage setting of the voltage regulating means dependent upon the operating condition of the source of electrical energy in relation to the load.

These and other objects of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

The drawing is a diagrammatic view of a system embodying the present invention.

Referring to the drawing, numeral 1 indicates a generator of conventional type including an armature and commutator 2 and shunt field winding 3.

The generator 1 has suitable terminals A, B, C and D. The terminal B is connected through a suitable conductor 5 to a shunt field winding 3 while the opposite end of the shunt field winding 3 is connected through a conductor 6 to negative output brushes on the commutator 2 suitably interconnected by a conductor 7. The commutator 2 has also provided positive output brushes suitably connected by a conductor 8. The conductor 8 is connected by a conductor 9 to a positive output generator terminal A, while the conductor 7 is connected by a conductor 10 to a generator terminal C, and by a conductor 4 to the negative output generator terminal D.

Leading from the field generator terminal B of the generator 1 is a conductor 11 which leads to a terminal 12 on a regulator 13. There also leads from the terminal C of the generator 1 a conductor 14 which is connected to regulator terminal 15.

Leading from the negative output terminal D of generator 1, is a conductor 16 which leads to a terminal 17 of the regulator 13.

A conductor 18 leads from the positive output generator terminal A to a regulator terminal 19. The generator 1 is controlled by the voltage regulator 13, including a variable resistance carbon pile element 20 connected at one end by an electrical conductor 21 to terminal 12 and through the conductor 11 to the field terminal B of the generator 1. The opposite end of the variable resistance element 20 is connected by conductor 22 to conductor 23 which interconnects regulator terminal 19 and a regulator terminal 24. Thus the conductor 22 leads through the conductor 23, terminal 19 and conductor 18 to the terminal A of the generator 1 and thereby to the positive output terminal of the generator 1.

Thus the carbon pile 20 regulates the excitation of the field winding 3, of the generator 1. The resistance of the carbon pile 20 is regulated by suitable electromagnetic windings arranged so as to control an armature 25 and thereby the pressure applied to the carbon pile 20 and the resistance thereof.

The regulator is shown diagrammatically in the drawing as including the armature 25 pivoted at 26 and exerting a compressive force upon the carbon pile 20 under tension of a spring 27. The spring 27 is arranged so as to balance the electromagnetic force applied on the armature 25 by an electromagnetic coil or winding 28 when energized by a voltage of a predetermined value and is preferably of a type such as shown in the patent application Serial No. 498,122 filed August 10, 1943. The coil 28 is connected at one end by a conductor 29 including suitable ballast resistors 30 and 31, to a terminal 32 and through conductor 33 to the terminal 17 and thereby through conductor 16, terminal D and conductor 4 to the negative terminal of generator 1.

The opposite end of the winding 28 is connected by a conductor 34 to the conductor 23 which is connected by a conductor 11 which in turn is connected to terminal 18 and to the positive output terminal A of the generator 1. Thus the coil 28 responds to the output voltage of the generator 1 across terminals A and D and is arranged to regulate the carbon pile 20 so as to control the excitation of the field winding 3 of the generator 1 so as to maintain a predetermined generator output voltage.

A second electromagnetic coil or winding 35 is provided for varying the datum or voltage setting of the winding 28. The winding 35 has one end connected by a conductor 36 to a terminal 37. The other end of the winding 35 is connected by a conductor 38 to a point intermediate the opposite ends of a voltage dividing resistor arrangement including the resistors 39 and 40. The resistor 40 has its opposite end connected to the conductor 33 while the opposite end of the resistor 39 is connected through an adjustable arm 41 to a terminal 15. It will be seen then that the resistors 39 and 40 are connected in parallel with leads 4, 16 and 33 through conductors 14 and 10, respectively.

A plurality of generators 1, 1A, 1B and 1C are provided as shown and each of the generators 1A, 1B and 1C has a regulator similar to the regulator 13 of the generator 1 and indicated herein as 13A, 13B and 13C, respectively. Likewise, for simplicity of illustration, the corresponding connections of the regulator circuits of the generators 1A, 1B and 1C are indicated by like numerals bearing a letter A, B, or C corresponding to the respective generator to which the same relates. The lines 33, 33A, 33B and 33C are grounded at the terminals 32, 32A, 32B and 32C so as to provide a common potential at such point.

The coil 35 is connected to a similar coil 35A, 35B, and 35C in each of the regulators 13A, 13B and 13C respectively, through an equalizer bus line 42. Through the arrangement of the voltage dividing resistors 39 and 40 connected across the leads 4, 16 and 33, it will be seen that the coil 35 connected thereto through conductor 38 is responsive to the voltage drop across the leads 4, 16 and 33 which have sufficient inherent resistance so that a decrease or increase in the voltage setting of the regulator 13 will result dependent upon the relative outputs of the several generators.

The windings 35A, 35B and 35C in each of the respective regulators 13A, 13B and 13C corresponding to the winding 35 in regulator 13 are so designed that upon the generator controlled by any one of the regulators 13 assuming a greater portion of the load than the other generators the voltage drop across the inherent resistance of the lines 4, 16 and 33 of such generator will exceed the voltage drop across the lines 4, 16 and 33 of the several other generators, whereupon a current will flow in the winding 35 of the regulator for the first mentioned generator in a like direction to the current flow in the winding 28 causing an increase in the magnetic force acting upon the armature 25 and increasing the resistance of the carbon pile 20 so as to reduce the voltage produced by the generator controlled thereby. The windings 28 and 35 are wound in relation one to the other so as to assure this action.

The direction of current flow through the winding 35 of the other regulators 13, however, will be in a direction opposite to that in its corresponding winding 28 so as to counteract the electromagnetic force of the main control winding 28 and thereby cause the spring 27 to tend to draw the armature 25 in a direction for decreasing the resistance of the carbon pile 20 so as to increase the voltage produced by the generator controlled by the same until the several generators are in a balanced relation.

The voltage coils 28 of the regulators 13, 13A, 13B, and 13C of the generators 1, 1A, 1B, 1C, respectively, are so calibrated as to regulate their respective generators so as to maintain substantially the same voltage.

Main output lines 43 and 44 lead from the terminals 24 and 32 of the regulator 13. Switches 45, 45A, 45B and 45C control the connection of the respective generators to a suitable load through load lines 44 and 47.

The adjustable resistances 39 in the several regulators provide a means whereby the voltage drop inherent in the several leads 33, 16 and 4 may be divided so that suitable adjustment may be made for variance in the inherent resistance of leads 33, 16 and 4 of the several generators, thereby permitting a balance of the load currents provided by the several generators during a normal division of the load.

From the foregoing, it will be seen that we have provided through the latter system a novel means for maintaining a proper division of load between the several generators.

Although only one embodiment of the invention has been illustrated and described, various changes in the form and relative arrangement of the parts, which will now appear to those skilled in the art, may be made without departing from the scope of the invention. Reference is therefore, to be had to the appended claims for a definition of the limits of the invention.

What is claimed is:

1. In combination, a load circuit, a plurality of generators, means connecting said generators to said load circuit, a regulator associated with each of said generators, each regulator including a variable resistance carbon pile element arranged to control the voltage output of its associated generator, electromagnetic means for varying the resistance of said carbon pile element, said electromagnetic means including a first winding connected across the output of its associated generator to regulate said carbon pile element so as to maintain a substantially constant voltage output from said associated generator, and a second winding for varying the voltage setting of said first winding, circuit means interconnecting the second winding of each regulator to the second winding of the other of said regulators, said circuit means including line resistance in the output circuit of each generator, a voltage dividing means connected across said line resistance and arranged in said circuit means in such a manner that upon a difference in the voltage drop across the line resistances of said regulators there may be effected a current flow through said second windings in such a direction as to tend to maintain a predetermined division of load between the respective generators, and said voltage dividing means including an adjustable resistance for effecting an initial balance of the load currents provided by the several generators upon a predetermined division of the load.

2. In an electrical control system of the class including a load circuit, a plurality of generators for said load circuit, means to connect the output of said generators to said load circuit, a regulator associated with each of said generators, each regulator including a main control coil and a load compensating coil, and electric circuit means interconnecting the compensating coils of the regulators of each of said generators so as to maintain a predetermined division of load between the generators; the improvement comprising each of said generators having associated therewith a line resistance in the output of each generator and a voltage dividing resistor connected across each of said line resistances and connected into said circuit means, the load compensating coil of each regulator connected to the voltage dividing resistor of its associated generator at a point intermediate the opposite ends of said voltage dividing resistor so that upon an unbalanced relationship in the voltage drop across the respective line resistances of the generators there may be effected a current flow through the compensating coils of the regulators of said generators in such a direction as to tend to maintain a predetermined division of load between the respective generators, and each of said voltage dividing resistors including an adjustable resistance element to set the division of load between the respective generators under varying operating conditions.

WILLIAM F. FELL.
EVAN S. SMITH.

REFERENCES CITED

The following references are of record in the file of this patent:

UNITED STATES PATENTS

| Number | Name | Date |
|---|---|---|
| 1,400,502 | Turbayne | Dec. 13, 1921 |
| 1,760,088 | Seeger | May 27, 1930 |
| 2,401,795 | Rady | June 11, 1946 |

FOREIGN PATENTS

| Number | Country | Date |
|---|---|---|
| 66,202 | Switzerland | Nov. 14, 1913 |